US006228304B1

(12) United States Patent
Silbergeld

(10) Patent No.: US 6,228,304 B1
(45) Date of Patent: May 8, 2001

(54) METHOD FOR PRODUCING CANDLES HAVING THREE DIMENSIONAL SURFACE DESIGNS

(76) Inventor: Joseph I. Silbergeld, 23 Creamery St., Apt. 3, Plainfield, VT (US) 05667-9441

( * ) Notice: Subject to any disclaimer, the term of this patent is extended or adjusted under 35 U.S.C. 154(b) by 0 days.

(21) Appl. No.: 09/239,849

(22) Filed: Jan. 28, 1999

(51) Int. Cl.[7] .................................................... B29C 33/40

(52) U.S. Cl. .......................... 264/225; 264/220; 264/338; 425/803

(58) Field of Search .................................... 264/219, 220, 264/338, 225; 425/803

(56) References Cited

U.S. PATENT DOCUMENTS

| | | | | |
|---|---|---|---|---|
| 3,867,501 | * | 2/1975 | Powers et al. | 264/219 |
| 4,004,773 | * | 1/1977 | Binder | 425/803 |
| 4,830,330 | * | 5/1989 | Cox et al. | 425/803 |
| 5,078,945 | * | 1/1992 | Byron | 425/803 |
| 5,244,620 | * | 9/1993 | Uchiyama | 264/220 |

* cited by examiner

*Primary Examiner*—Allan R. Kuhns
(74) *Attorney, Agent, or Firm*—Kevin Ellicott, Esq.

(57) ABSTRACT

A method for producing candles having surface designs comprising creating a rubber stamp, building a frame atop the rubber stamp, the frame and rubber stamp forming a reservoir, filling the reservoir with casting material, allowing the casting material to harden, removing the hardened casting material, creating as many casting materials as the candle to be produced has sides, connecting the casting materials together in the form of a box with an open top and bottom, constructing a dam around the box, the space between the box and the dam defining a reservoir, filling the box with filler, filling the reservoir with sufficient mold material so that the box is submerged, allowing the mold material to set, disassembling the dam, removing the set mold material from around the box, the set mold material having an open end, inverting the mold material so the open end faces upwardly, rebuilding the dam about the mold material, pouring liquefied candle wax into the mold material open end until the mold material is completely filled by the liquefied candle wax, allowing the liquefied candle wax to set into a final candle, disassembling the dam, removing the final candle from the mold material.

5 Claims, 4 Drawing Sheets

METHOD FOR PRODUCING CANDLES HAVING THREE DIMENSIONAL SURFACE DESIGNS

CROSS REFERENCE TO OTHER APPLICATIONS

This is the first submission of an application for this article of manufacture. There are no other applications, provisional or non provisional.

FEDERALLY SPONSORED RESEARCH AND DEVELOPMENT

There are no federally sponsored or funded research or development projects or undertakings in any way associated with the instant invention.

BACKGROUND OF THE INVENTION

1. Field of the Invention

The instant invention relates to that field of methods for producing articles of manufacture known as candles. Specifically, the instant invention is a method for producing candles having three dimensional designs upon their exterior surfaces.

2. Background Information

The prior art known to applicant discloses that the art of candle making is well known. Historically, candles are one of the oldest known means for supplying light. References to candles date to at least 3000 B.C. in Crete and Egypt. It is believed that molds were first used in candle making in Paris during the 15th century. During the 19th century, candle making enjoyed a renaissance. A number of "modern" technical innovations were introduced which eliminated many of the unpleasant aspects of candle burning. Furthermore, the industrial revolution left its mark on the candle making industry at this time with the advent of mechanical candle making machines.

The prior art discloses that there are a limited number of methods known for making candle molds. Five basic types of flexible mold compounds are most often used. Included in these mold compounds are so called "Hot-Melt" (polyvinyl chloride) systems, latex systems, silicone rubber systems, polysulfide rubber systems and polyurethane flexible mold compounds.

The prior art further discloses that there are five basic types of molds which may be created using the above compounds. These are the flat-back one piece mold, the split one-piece mold (unshelled), the one-piece mold (shelled), the split one-piece mold (shelled) and the multi-piece mold (shelled or unshelled).

Producing a candle having any sort of surface design has been a difficult process. By the term "surface design", Applicant means any sort of ornament or design which may be created on the exterior surface of the candle. Examples of surface designs include lettering, graphic designs, and simple textures such as striations, crosshatching and the like.

Until inventor's method, surface designs such as lettering and graphic designs were difficult to produce. For example, if one wished to apply a series of letters to the surface of the candle, one would have two basic choices: impress the letters into the candle; or create a mold which would produce letters which stood out from the surface of the candle or were incised into the surface of the candle.

In the first case, impressing the letters into the candle, a number of difficulties are encountered. First, a suitable stamp must be produced. This was most often accomplished in the prior art by utilizing individual metal stamps, one for each letter. Most analogous here would be the use of commercially available type used in the past by type-setters in the printing trade. These letters (either singly or strung together in a "block" and held in a frame) protruded from a back ground upon which they were mounted such that when pressed against a candle, the letter (but not the background) would appear as an indentation in the candle. Because the letter was stamped into the surface of the candle through the application of pressure to the stamp and against the candle surface, the material chosen for making the stamp had to be harder than the wax to be stamped. This meant that most rubber compounds and some plastic compounds would be too soft, and hence unsatisfactory.

Unfortunately, creating surface designs in this manner results in a second difficulty. Candle wax is ideally a reasonably hard wax. A harder wax is desirable so that when the candle is lit, only the portion directly adjacent to the burning wick will liquefy. When too soft a wax is used, the heat generated during wick burning may be transferred throughout the soft wax, which then softens further, ultimately leading to one large puddle of liquid wax where the candle once stood instead of a small puddle surrounding the wick of an intact candle.

When a harder wax is utilized, the process of stamping letters or designs into the exterior surface of the candle becomes problematic. If the design on the metal stamp is at all intricate (for example, when applying a cursive letter "g", there will be fairly deep indentations in the centers of the upper portion of the letter and the lower portion of the letter), the wax will have a tendency to remain in the indented portions of the design when the stamp is pulled free of the candle, following stamping. The more complicated the design, that is, the more indented portions locatable on the surface of the metal stamp, the greater the likelihood that some of the candle surface will be pulled free of the candle when the stamp is removed. Such pulling free of the surface of the candle ruins the design, and requires extensive manual labor to rectify.

A third problem associated with stamping into the surface of the candle is that of surface deformation. When a candle is stamped into, the wax material which is pushed free of the upraised areas on the metal stamp must go somewhere. As the candle wax is not terribly compressible, it should be clear that the wax must flow out of the indentation produced by the metal stamp, and relocate elsewhere. In practice, this means the wax will be pushed out of the recessed (incised) area created in the candle by the metal stamp, and flow onto the surface of the candle, clear of the area occupied by the stamp. Once the stamp is removed, wax fragments must be cleared from the surface. Often, these fragments are still slightly attached to the candle's exterior surface, and pulling them free will further mar the candle finish. Once marred, the surface will require additional repair and refinishing. Obviously, if one is making many copies of a candle in this manner, the amount of labor required to stamp, clean, and refinish can quickly become exorbitant.

Furthermore, the harder the wax used in making the candle, the less likely the wax is to "flow" when stamped. This means that while a particular wax may be ideally suited for use in candles, the exterior surface of that same wax may be nearly impossible to stamp into without seriously marring that surface. Not only does such marring require additional "touch up" work, but it makes application of an intricate design, with any reasonable expectation of clear surface impression resolution, nearly unattainable.

Finally, while this method may be reasonably satisfactory when applying surface designs to a candle having a relatively flat surface, it is wholly unsatisfactory in the case where a design is desired on a candle having a spherical or cylindrical configuration. In either of these cases, the stamp which is to be applied must be concave or curved at angles which match the surface of the sphere or cylinder. This means that expensive and specialized equipment must be used in order to create the stamp, thus dramatically increasing the cost of the final product.

In the second case, creating a mold which would produce letters which stood out from the surface of the candle (or were incised into the surface of the candle), a different set of problems emerges. This method usually entails the hand fabrication of an original model.

Hand fabrication of an original model means the preparation of an exact duplicate of the final product (a candle having three dimensional surface designs) using a different material than that from which the final item will be fabricated. This may be accomplished using clay, wood, metal, plastic, plaster or any other suitable material. The original model is fabricated into the shape which the final product will take. Its surface is then engraved or carved to exhibit the design or texture desired in the final product.

The engraving or carving of the surface of the original model is a laborious process. It requires a craftsman sufficiently skilled in working with both the material from which the original model made, and the art of applying (carving, engraving, chiseling) a design to that material.

The first problem created by this method is that the material used when preparing the original model must be capable of accepting and retaining the design which will appear on the final product. For example, if one uses a rough colloidal material to create the original model, it will be very difficult to engrave fine details onto its surface. While this material may be easier to carve, it will support only the grosser elements of the design, while the finer elements may be lost.

On the other hand, if one uses a material having a much finer composition (for example, glass or plastic), the process of carving the design into its surface becomes all the more difficult and labor intensive. In such a case, few craftsmen will willingly undertake an extremely intricate design.

Once the hand carved original is complete, a mold is prepared from it. The method most analogous to the instant method is the one piece split mold. This method entails creating an enclosure or "dam" around the hand carved original. This dam is most often constructed from flat, essentially square or rectangular, wood sheets. The wood sheets are constructed into a box having four sides, an open top and an open bottom. Various fasteners are used to hold the wood sheets together.

The dam is then placed on a non-porous surface, and fastened to that surface such that it will not move, nor will liquid seep out of the box. Most often this is accomplished by placing a clay or similar material along the bottom edge of the dam, and then pressing downwardly on the dam so that the clay seals the space between the dam and the non-porous surface.

When preparing the dam, its dimensions are such that a small space (generally between ½ of an inch and 1 inch) is present between the surface of the hand carved model, and the interior surfaces of the dam.

Liquefied rubber (or similar material) is then poured into the dam, filling the space between the dam inner surfaces and the hand carved model's exterior surface. This rubber is allowed to solidify before removing the dam. Once fully set, the rubber may be stretched or cut free of the hand carved model.

The rubber mold which has thusly been achieved is then used to create the final product. This is accomplished by building a frame snugly around the rubber mold so that the mold has support, and then pouring hot liquid wax into the mold. Candle makers often spray a releasing agent such as silicon onto the surface of the mold which will contact the hot wax, prior to the wax being poured. The wax sets as it cools, and once sufficiently set, may be pulled free of the rubber mold. The candle thus produced is a nearly identical copy of the original hand carved model, having present upon its surface all the surface designs present upon the hand carved original. The mold is then cleaned and prepared for another "casting".

SUMMARY OF THE INVENTION

The instant invention is a method for making candles having three dimensional surface designs such as graphic designs, words and textures. A first object of the present invention is to eliminate the need to hand carve an original model when creating candles having surface designs. the instant method makes it possible to produce candles having surface designs from the most simple, such as a word, to extremely complex, such as the portrait of an actual person.

Another object of the instant method is to permit the creation of candles having surface designs without having to stamp those designs into the surface, and thereby avoid the marring of the surface which usually accompanies such stamping.

Another object of the instant novel method is to permit the creation of cylindrical, spherical, and other shaped candles having surface ornamentation without the need to manufacture stamps whose surface curvature matches the surface curvature of the candle.

The instant method accomplishes the above objects in a manner which differs significantly from the prior art in a number of respects. First, unlike the prior art, the instant method does not require the production of a hand carved original. In the preferred embodiment of the invention, the method is begun by instead creating a rubber impression of the design which will ultimately appear on the surface of the candle. This is accomplished by the production of a rubber stamp having an exact mirror image copy of the design which will ultimately appear on the surface of the candle. Preparation of the rubber stamp proceeds in the manner commonly utilized for making "rubber ink stamps". In the art, this is most often accomplished by beginning with a design which is rendered two dimensionally on paper. A photo-copy machine capable of copying onto mylar sheets, or similar material is then used to create a photo-transparency copy of the two dimensional design. Next, the photo transparency is mounted onto a light table and a frame is constructed over the photo-transparency. The frame is filled with a liquefied photocatalytic rubber and an ultraviolet light is shined from the light table, through the photo-transparency. The ultraviolet light strikes a liquefied photocatalytic rubber wherever the photo-transparency is transparent. The photocatalytic rubber struck by the light is thereby set. The set photocatalytic rubber sheet is then removed from the light table. The uncatalyzed rubber is then removed, most often by washing the catalyzed rubber with a material capable of removing the uncatalyzed rubber, thus revealing the design. Those areas of the photocatalytic rubber which were not struck by the light remain uncatalyzed and easily removed and a rubber stamp having the desired design thereupon is thusly produced.

Once the rubber stamp has been manufactured, this rubber stamp is used to produce exact plaster cast copies of the design by building a dam around the rubber stamp, pouring a casting material such as liquefied plaster into the dam, thereby covering the rubber stamp, the rubber stamp having previously been coated with a releasing agent. This step is reproduced as many times as the candle has sides upon which the design is desired to appear, one plaster cast copy per candle side.

Having created the plaster cast copies;, the plaster castings are next connected to one another, in the same form which the candle is ultimately to take, said copies facing outward such that the design on the surface is exposed. The hollow interior portion defined by the connected plaster copies is then filled in order to give the plaster copies support.

It should be clear that the instant method has now created the equivalent of a polygonal "hand carved original", without the need to hand carve it. Unlike the prior art, this method creates an exact duplicate of the design which is to appear on the candle with minimal effort. The article formed by this method may be referred to as the "production prototype".

Next, a dam is constructed about the production prototype, leaving a space between the exterior surface of the production prototype and the interior surface of the dam, and pours a room temperature catalyzing rubber into that space, completely covering the production prototype. The rubber is allowed to harden and set, and the dam surrounding it is disassembled. The production prototype may then be removed by cutting or stretching the rubber free of the production prototype.

Finally, the dam is reconstructed around the rubber mold in order to better support said mold, and liquefied candle wax is poured into the mold. Upon cooling and setting, the candle may be removed from the mold by either stretching or opening the mold along the previously made cut line.

It should be readily appreciated that the candle so produced is an exact duplicate of the original design first created on paper, the design now appearing in three dimensions on the candle surface. Unlike prior art methods which require the design to be stamped into the surface, this method produces designs with little to no surface deformation.

A further object of the instant method is to produce cylindrical candles having surface ornamentation. Production of candles of this sort usually requires the fashioning of metal plates upon which the desired design is stamped. These plates are usually pressed against the cylindrical candle, creating the sort of surface deformation and movement of wax noted above in connection with flat sided candles.

The instant method avoids the problems associated with stamping into the surface of cylindrical candles. In the second embodiment of the instant method, a two dimensional drawing is transferred to a photo transparency, and rubber stamp is prepared from the photo transparency as in the case of the polygonal candle. Unlike the polygonal candle method, the rubber stamp is next wrapped around nearly onto itself, forming nearly a cylinder having the design facing outwardly. This nearly cylindrical rubber stamp bearing the desired design is then placed into a rigid, transparent cylinder somewhat taller than the rubber stamp, and casting material is poured into the transparent cylinder, filling it. Once removed from the transparent cylinder, a hardened cylindrical casting having the rubber stamp integrally formed thereupon with the desired design facing outwardly has been produced. Said hardened cylindrical casting having the rubber stamp integrally formed thereupon may be referred to as the second production prototype.

Next, this second production prototype is placed within a second, slightly larger cylinder. The slightly larger cylinder is sealed along the bottom to the surface upon which it stands. Room temperature catalyzing rubber is then poured into the slightly larger cylinder, filling it and covering the second production prototype. Once the rubber sets, the rubber coated production prototype is removed from the second hollow cylinder. The rubber mold may be cut free from the second production prototype. The set rubber bears a mirror image (background/foreground reversal) copy of the desired design. This set rubber mold is the second rubber mold.

Finally, the second rubber mold having the desired design mirror image is inverted and replaced within the slightly larger cylinder, the slightly larger cylinder acting as the supporting framework of the second rubber mold. Melted candle wax is now poured into the second rubber mold and allows the melted candle wax to set in contact with the desired design mirror image. The candle wax having set, the second rubber mold is removed from the slightly larger cylinder, and, peeled free of the finished cylindrical candle. The design which appears on the candle is the mirror image of the design found on the second rubber mold, and is therefore an exact copy of the original desired design.

The prior art fails to reveal any method for creating candles which are neither box-like nor cylindrical and which have surface designs or ornamentation upon their exterior surfaces. The shape of these candles may be generally referred to as "other shaped". The third embodiment of the novel method is capable of producing such other shaped candles.

The third embodiment of his novel method begins by obtaining an other shaped object (such as a baseball), and attaching it to a stem made of clay or similar material. The stem is then attached to a substantially rigid, horizontal, flat, liquid impermeable and non-porous surface upon which it stands. Next, the other shaped object is completely painted with a relatively thick coating of room temperature catalyzing rubber. This mold coating is allowed to set.

Next, a framework is constructed around the other shaped object and attached to the surface upon which it is constructed with a sealer such as clay. A dam such as that described above is used to serve as framework. Care is taken to ensure that there is a space between the interior surfaces of the framework, and the exterior surfaces of the other shaped object closest to those framework interior surfaces.

Next, a liquefied foam rubber which sets at room temperature is poured into the framework surrounding the other shaped object. A sufficient amount of the liquefied foam rubber is poured into the framework so that the rubber coated other shaped object attached to the stem is completely covered.

When the liquefied foam rubber has set, it is referred to as an exoskeleton. The framework is disassembled and the exoskeleton removed. The exoskeleton is then cut free of the rubber coated other shaped object. The mold coating is then cut free of the other shaped object. The mold coating is now referred to as the third rubber mold.

Once removed from the other shaped object, the third rubber mold is set back into the same space in the exoskeleton which it formerly occupied when it had the other shaped object within it.

The combination third rubber mold/exoskeleton/framework is then inverted such that the space formerly occupied by the stem is at the top of the third rubber mold, facing upwardly. The space formerly occupied by the stem now serves as a "pouring spout" providing access to the interior of the third rubber mold. Liquefied candle wax is poured into the spout. Once hardened, the completed candle may be removed by disassembling the dam, opening the exoskeleton, and removing the mold coating from the completed candle.

As described above, this method may produce square, rectangular and other polygonal candles with nearly perfect renditions of the desired design, upon the candle's surface. Unlike those prior art methods known to the inventor, no hand carved original is required. Furthermore, there is no need to fabricate expensive and complicated metal stamps for pressing designs into the candles. Finally, there is no surface damage caused by the stamping of such metal stamps against the surface of the candle in order to produce the desired surface ornamentation.

A DESCRIPTION OF THE PREFERRED EMBODIMENT

In the preferred embodiment of the inventor's method, inventor begins by creating a two-dimensional representation of the design which is to appear as surface ornamentation on a candle. The best method known to the inventor for so doing is to create a rubber stamp having upon it the design which is to appear on the candle. The rubber stamp so created is of the type well known in the art, most commonly used as an ink stamp, the rubber stamp being flexible.

Figure 1:
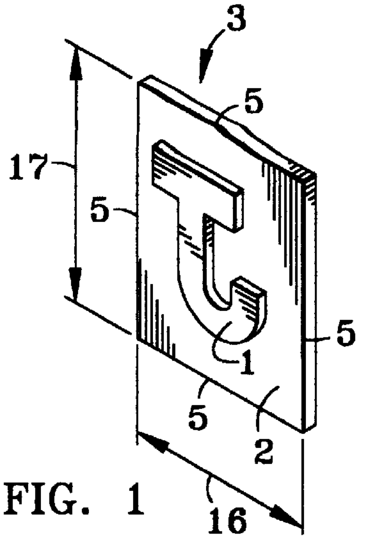
FIG. 1 is a perspective view of a rubber stamp having a surface design as foreground.
Figure 2:
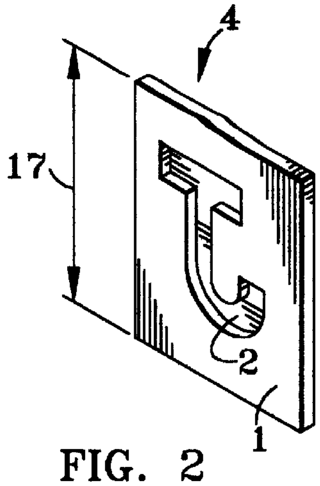
FIG. 2 is a perspective view of a rubber stamp having a surface design as background.

The rubber stamp used will have upon its surface a mirror image (that is, appearing as though it was being viewed in a mirror, with all elements reversed) of the desired design, either embossed, or incised. As per FIG. 1, the desired design, (in this case a mirror image of a capital letter "J") upon the rubber stamp (3) is embossed, that is, it stands as foreground (1) above the background (2). On the other hand, as per FIG. 2, one may instead choose the desired design to appear as a mirror image on the rubber stamp (4), incised as background (2) while the foreground (1) is devoid of design or blank.

In the preferred embodiment of this method, the decision must be made as to whether one wishes the desired design to appear on the completed candle as foreground or as background. Experience has shown that designs which stand out from the surface of the completed candle, that is, appear as foreground, generally tend to be damaged more easily during handling and transportation. Therefore, it is preferred that the desired design to appear on the completed candle as background. In the preferred embodiment of the method, if the design which is to appear on the completed candle is to be present as background, then the design must appear on the rubber stamp as foreground. A rubber stamp is therefore made having the desired design as foreground. Obviously, if one preferred to have the design appear on the completed candle as foreground, one would instead begin by creating a stamp upon which the desired design appeared as background.

Figure 3:
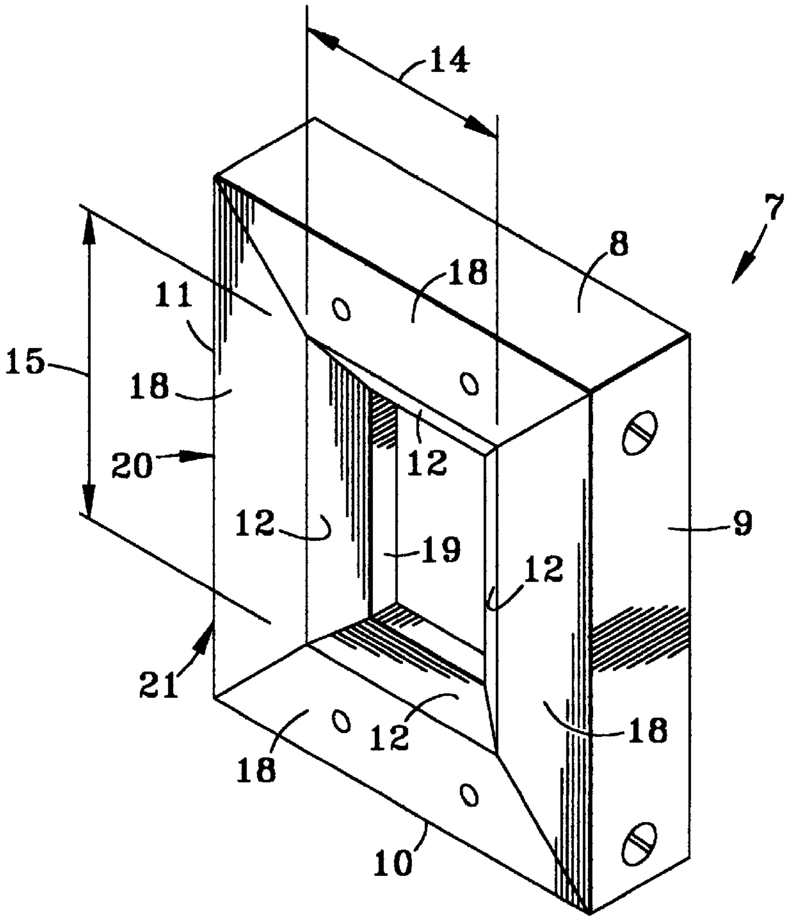
FIG. 3 is a perspective view of a frame.
Figure 4:
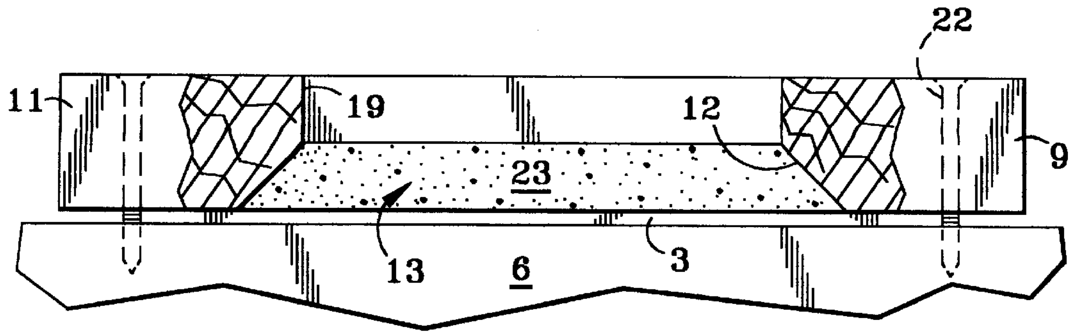
FIG. 4 is a partially cut away side view of a frame and a rubber stamp.

Next, as per FIGS. 3 and 4, the rubber stamp (3) is placed upon a substantially horizontal flat, rigid, non-porous and liquid impermeable surface (6) such as plexiglass or wood which has been treated or coated to make it non-porous and liquid impermeable. The rubber stamp design must face upward, away from the non-porous surface upon which the rubber stamp is placed. The rubber stamp (3) having the desired design thereupon is firmly affixed to the substantially flat, rigid, non-porous surface (6). Firm affixation of the rubber stamp to the substantially flat surface may be accomplished using any removable affixation means. In preferred embodiment of the method, the removable affixation means is a rubber cement. The surface of rubber stamp having upon it the design is then coated with a release agent such as silicone.

Figure 5:
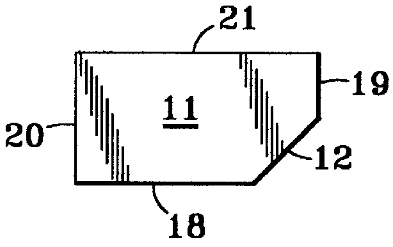
FIG. 5 is a cross sectional view of a frame rail.

As per FIGS. 3, 4 and 5, a first dam (7) is constructed atop the rubber stamp. The first dam is preferably constructed from wood, though other materials such as metal or plastic would work equally well. The first dam (7) is best constructed from a first frame rail (8) a second frame rail (9), a third frame rail (10) and a fourth frame rail (11). Each frame rail has a first end and a second end, the first end and the second end each being cut at a 45 degree angle such that when fully constructed, the first dam is in the shape of a square or rectangle. Furthermore, it is critically important that each frame rail have a beveled surface (12).

As per FIG. 5, using the fourth frame rail as an example, the frame rail has a beveled surface (12), a bottom surface (18), an outer surface (20) a top surface (21) and an inner surface (19). The inner surface is adjacent to the beveled surface (12) and the top surface (21). The top surface is adjacent to the inner surface (19) and the outer surface (20). The outer surface is adjacent to the top surface (21) and the bottom surface (18), and parallel to, though not co-planar with, the inner surface. The bottom surface is adjacent to the outer surface (20) and the beveled surface (12), and is parallel to, though not co-planar with, the top surface (21).

As per FIGS. 3 and 4, the frame rails are attached to one another such that each beveled surface is adjacent to another beveled surface. Once the frame rails have been attached to each other so as to construct the first dam, the beveled surfaces of the frame rails define the sides of a reservoir (13). It has been learned that it is extremely important that the beveled surfaces be non-porous. This is most efficiently accomplished by coating the beveled surfaces with a cellulose tape or liquid silicone which solidifies when dry.

It has also been learned that the angle of the beveled surface of the frame rails is dependent upon the shape of the completed candle which is to be produced. For example, if the completed candle is to be in the shape of a cube, then the angle of the beveled surface of each frame rail must be 45 degrees. If the completed candle were to be in the shape of an octagon, however, then the beveled surface of each frame rail would need to be 22.5 degrees. In short, the angle of bevel equals 360 degrees divided by two times the number of sides (excluding the top and bottom) which the completed candle is to have.

The first dam (7) is constructed atop rubber stamp such that peripheral edges (5) of the rubber stamp (3) extend beyond the reservoir widest portion (14) and the reservoir longest portion (15). The reservoir widest portion may be better understood as being measured from where the fourth frame rail (11) edge along which the beveled surface (12) and the bottom surface (18) meet to the opposite second frame rail (9) edge where the beveled surface (12) and the bottom surface (18) meet. The reservoir longest portion may be better understood as being measured from where the third frame rail (10) edge along which the beveled surface (12) and the bottom surface (18) meet to the opposite first frame rail (9) edge where the beveled surface (12) and the bottom surface (18) meet.

In effect, the rubber stamp is pinned between the substantially flat, non-porous and liquid impermeable surface and the first dam (7), the rubber stamp forming the bottom of the reservoir (13). Clearly, the rubber stamp width (16) and the rubber stamp length (17) must be greater than the length of the reservoir longest portion (15) and the reservoir widest portion (14). The first dam is then securely fastened to the substantially rigid, non-porous surface utilizing fastening means (22). It is preferred to use screws as the fastening means as they pull the first dam downwardly when tightened, thereby creating a strong seal between the first dam and the rubber stamp so as to prevent leakage of fluid from the reservoir later in the method. However, other means such as threaded bolts and nuts or C-clamps would work equally well, so long as a liquid impermeable seal was formed between the rubber stamp and the reservoir which prevented any leakage of liquids out of the reservoir, once filled. Prior to pouring any liquid into the reservoir, Applicant believes it is best to coat the frame rails and the rubber stamp with a release agent. In the preferred embodiment, silicone is used as the release agent.

Next, a rigid mold material (23) is poured into the reservoir. The rigid mold material preferred is a colloidal casting material in a liquid state which hardens upon drying, thereby creating a hardened casting and which may be cut into or etched without great difficulty. Specifically, a gypsum based casting plaster such as what is known in the trade as Hydrocal, a water mixed cement is utilized. As per FIG. 4, this rigid mold material in its liquid state is poured into the reservoir (13), filling the reservoir and completely covering the rubber stamp (3). A sufficient amount of the rigid mold material is poured into the reservoir so as to completely cover the beveled surface (12) of the frame rail, but not so much as to come into contact with the inner surface (19) of the frame rail.

Figure 6:
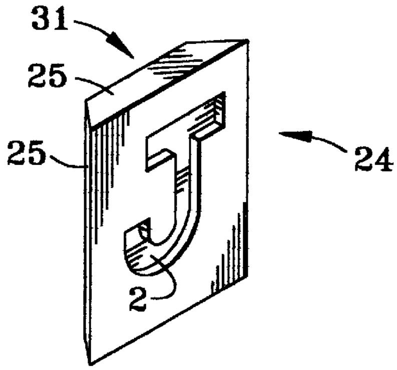
FIG. 6 is a perspective view of a hardened casting having a surface design.

As per FIG. 6, the rigid mold material is allowed to set (harden), becoming solid which is referred to as a hardened casting (24). The first dam is then disassembled, and the hardened casting (24) is removed by pulling the rubber stamp (3) free from the hardened casting (24). The hardened casting now has, upon the surface of that hardened casting which was in contact with the rubber stamp, an exact duplicate of the rubber stamp, the design being present on the hardened casting in background/foreground reversal relative to the design locatable on the rubber stamp. In other words, those portions of the design which comprised the foreground on the rubber stamp (for example, as per FIG. 1, letter "J" appearing as foreground) now appear as background on the hardened casting (for example, as per FIG. 2, the letter "J" appearing as background). The letter "J" is no longer a mirror image. Furthermore, the hardened casting has beveled edges (25), the hardened casting beveled edges being at the same angle as were the beveled surfaces of the frame rails with which the hardened casting was in contact.

Next, the previous step is reproduced as many times as needed, depending upon the number of sides which the final candle will have. For example, As per FIG. 7, should the candle to be produced be in the form of a cube, there should be produced a hardened casting (24) a second hardened casting (26), a third hardened casting (27) and a fourth hardened casting (28). Each hardened casting will have upon it the desired design. If, however, the design is to appear on any less than all of the sides of the completed candle (excluding the top of the candle and the bottom of the candle), then a hardened casting having no design is substituted for each such "blank" candle side. Such a hardened casting having no design is most easily created by using a rubber stamp devoid of surface design, that is, one composed entirely of background or foreground. Furthermore, in the event that different designs are desired on some or all of the completed candle sides, then rubber stamps having the different desired designs are used to make each individual hardened casting. For understanding's sake, the preferred embodiment of this method assumes that the same design will appear on each side of the completed candle.

Figure 7:
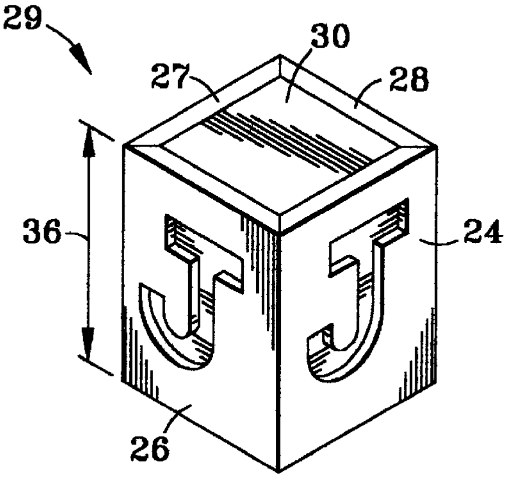
FIG. 7 is a perspective view of a production prototype.

As per FIG. 7, according to the instant method, the hardened castings are then connected to one another such that the exterior surface of each hardened casting having upon it the desired design, faces outwardly, away from each other. For example, if the final product candle is to be in the form of a cube, four hardened castings are attached to one another, beveled surface to beveled surface such that each hardened casting is adjacent to two other hardened castings, and faces away from an oppositely aligned hardened casting. The connected hardened castings may now be referred to as the first production prototype (29). It is preferred to place glue or other similar attaching substance on the beveled surfaces of the hardened casting which will be attached to other hardened castings.

At this point, the production prototype has a hollow interior space defined by the interior surfaces (31) of the connected hardened castings. Next, the hollow interior portion of the first production prototype is filled completely with filler material (30) (preferably the same material as that from which the production prototype was produced). It has been found that this step may most easily be accomplished by placing the first production prototype on a horizontal, substantially non-porous surface and placing a bead of impermeable material along the seam where the first production prototype (29) and the substantially non-porous surface meet so as to prevent the filler material from leaking out of the hollow interior before the filler material solidifies. Generally, a pliable clay is used for the impermeable material. Filling of the hollow interior of the first production prototype results not only in the hardened castings being better connected to one another, but also provides additional stability to the first production prototype. It should be immediately grasped that, when the final product is to be a cube, filling in this manner produces the additional top surface and bottom surface which did not have upon them any design elements.

As may be readily understood now, the instant method has produced the first production prototype (29), which is the equivalent of a "hand carved original", without the hand carving. Unlike the prior art methods which require extensive carving and finishing work, this method requires the production of only one rubber stamp which is used to produce a sufficient number of hardened castings which in turn serve as the building blocks for construction of a first production prototype. All of this is accomplished through the instant method, without the necessity of hand carving, while at the same time reproducing an exact copy of the desired design.

Figure 8:
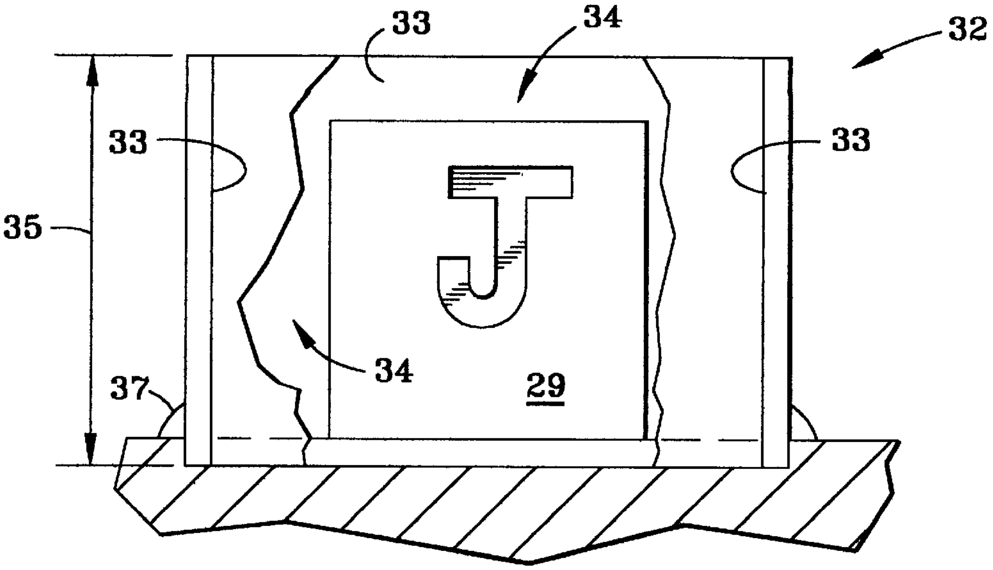
FIG. 8 is a partially cut away side view of a second dam constructed around a production prototype.

Next, as per FIG. 8, the first production prototype (29) is placed on a substantially horizontal, non-porous and liquid impermeable surface, coats the production prototype with a releasing agent and constructs a second dam (32) around the first production prototype. The second dam (32) may be constructed most efficiently by constructing a hollow box having an open top and an open bottom. It has been learned that the second dam performs most adequately when the substantially horizontal, non-porous surface has been grooved (routed) such that the second dam may be set into the groove. Clearly, the groove must follow the contour of the second dam in order to permit the dam to set into the groove. The groove works best when it is approximately ¼ of one inch or greater in depth.

Furthermore, the second dam height (35) must be somewhat greater than the first production prototype height (36). It is believed that a height difference of approximately one to two inches is sufficient. The inner surfaces (33) of the second dam define a continuous interior surface. It is believed that the continuous interior surface of the second dam (32) should be approximately ½ of one inch away from all adjacent first production prototype exterior surfaces (that is, the portions of the production prototype in closest proximity to the inner surface of the second dam) of the first production prototype. The space between the second darn inner surface, the adjacent first production prototype exterior surfaces and the portion of the substantially horizontal, non-porous liquid impermeable surface directly beneath the space between the first production prototype exterior surfaces and the continuous interior surface of the second darn serves as a mold reservoir (34) into which liquefied mold material will be poured.

It is useful to coat the continues interior surface of the second dam and the portion of the substantially flat, non-porous surface visible within the mold reservoir with a releasing agent. In addition, it is useful to fasten the first production prototype to the substantially flat, non-porous surface (utilizing a screw passing through the substantially flat, non-porous surface and extending into the first production prototype). In addition, the inventor frequently places a second bead of impermeable material (37) along the lower exterior portion of the second mold, circumferentially, such that it touches both the second mold and the substantially flat, horizontal, anon-porous surface to further prevent any leakage from within the mold reservoir.

The mold reservoir is then filled with a mold material. Generally, the second mold is completely filled to ensure that the mold material covers the top of the first production prototype. In the preferred embodiment of this method, it is preferred to utilize a room temperature vulcanizing rubber which is pliable when fully set as the mold material, and a sprayable silicone for the releasing agent. The mold material is then allowed to set while in contact with the production prototype. Once set, the mold material becomes the first candle mold.

Next, the second dam is disassembled and removed from around the first production prototype, and the first production prototype is removed from the substantially horizontal, flat, non-porous surface. Because the first candle mold is constructed of a pliable material, it may then be worked free of the first production prototype by stretching the first candle mold slightly and pulling it away from the first production prototype. It has been learned that while it is possible to work the first mold free of the first production prototype without cutting the first candle mold, it is often easier to use a standard mold key knife and create a mold key cut to assist in removing the first production prototype from the first candle mold.

The interior surface of the first candle mold (that is, the surface which has been in contact with the first production prototype) will have thereupon the same design elements which were present on the first production prototype, with yet another background/foreground reversal. In keeping with the example used thus far, the "J" which appeared on the exterior surface of the first production prototype now appears on the interior surface of the first candle mold. The "J" which was noted as being background on the first production prototype now appears on the interior surface of the first candle mold as foreground, that is, the "J" appears to stand out from the interior surface of the first candle mold, embossed, and is a mirror image. It should be readily apparent that the thickness of the final mold is related directly to the distance provided between the exterior surfaces of the first production prototype, the continuous inner surface of the second dam, and the distance which foreground elements extend away from the background on the production prototype. Clearly, there must be a sufficient distance between the foreground elements and the continuous inner surface of the dam so that the final mold material does not crack or break when being pulled free of the first production prototype.

In the final steps of this method, the first candle mold is inverted so that the open end (the end formerly in contact with the substantially impermeable surface upon which the production prototype sat) is upward, revealing the hollow space formerly occupied by the first production prototype. The second dam is reconstructed around the first candle mold to better support the now empty first candle mold. The interior surface of the first candle mold is coated with a releasing agent. The wax from which the completed candle is to be made is liquefied, and poured into the first candle mold. Upon re-solidification of the wax, the first candle mold is pulled free of the wax, revealing a completed candle having upon its surfaces exact reproductions of the desired designs. Those skilled in the art of candle making will note that no provision has been made for the insertion of a wick into the candle. It is believed that those familiar with the art will immediately recognize that the wick is placed into the first candle mold prior to pouring the liquefied candle wax, and that this method requires no additional skills or disclosure in order to do so.

The preferred embodiment of his method eliminates the necessity of hand carving original models, or stamping designs into the surface of the candle, thereby significantly decreasing the time and labor required in order to produce candles having surface designs. Additionally, this method makes possible complex and intricate designs never before possible through commercial mass production, and does so in an inexpensive manner.

In a second embodiment of the invention, the method disclosed by the inventor may be utilized in the production of candles having curved exterior surfaces, for example, candles having a cylindrical form. As with the polygonal candle, the method starts by producing a rubber stamp having thereupon the desired design.

Figure 9:
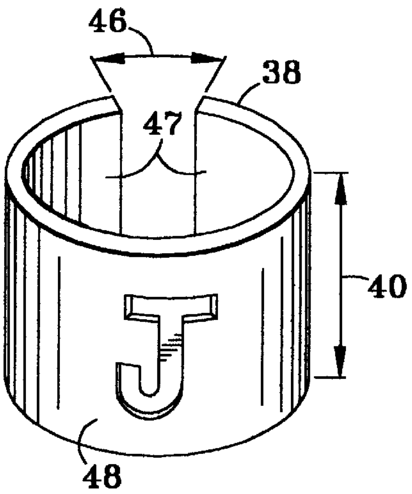
FIG. 9 is a perspective view of a nearly cylindrical rubber stamp.

At this point, as per FIG. 9, the second embodiment differs somewhat from the preferred one as disclosed above. First, if the design which is to appear on the completed candle is to be incised into the candle (that is, appear as background as per FIG. 2), the design elements on the rubber stamp must appear as foreground. Furthermore, the design on the rubber stamp should not be present as a mirror image, that is, in keeping with the earlier example, the letter "J" would not appear as a mirror image, but would rather be oriented just as it would ordinarily appear in print.

Next, rather than building a dam around the rubber stamp and using the stamp to produce a hardened casting, instead the rubber stamp is folded into the form of nearly a cylinder (38), the side edges of the rubber stamp not touching one another and the design elements being locatable on the nearly a cylinder exterior surface (48).

Figure 10:
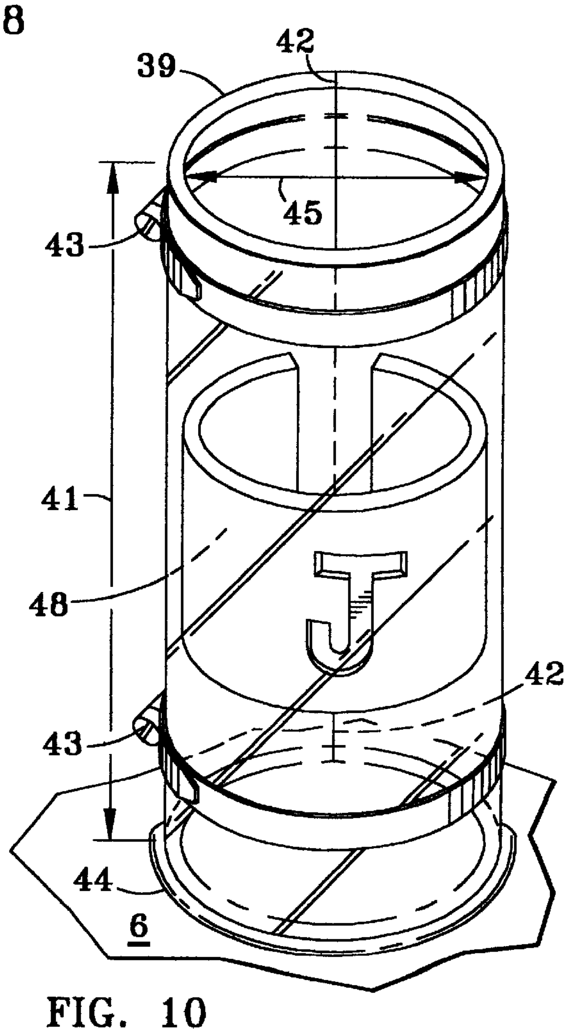
FIG. 10 is a perspective view of a nearly cylindrical rubber stamp within a cylinder.

As per FIG. 10, the nearly cylindrical rubber stamp is then placed within a substantially rigid, ideally transparent, first hollow cylinder (39). The nearly cylindrical rubber stamp should be placed within the first hollow cylinder (39) such that it appears in the same position it will appear on the finished candle. The hollow cylinder is preferably constructed from transparent plexi-glass or other clear plastic. The nearly cylindrical rubber stamp (38) should have a length (40) less than the hollow cylinder length (41). For example, if the desired candle is to be ten inches tall, the nearly cylindrical rubber stamp, when placed into the hollow cylinder should be less than 10 inches tall. In the second embodiment of this method, the first hollow cylinder (39) acts as a third dam.

It has also been learned that later removal of the contents of the first hollow cylinder (39) is better facilitated if the hollow cylinder has a split (42) along its entire length, the split passing completely through hollow cylinder interior surface and hollow surface exterior surface. When the hollow cylinder has such a split, clamping means (43) a wrapped around the hollow cylinder prior to use, and tightened sufficiently to prevent leakage through the split. The inventor generally uses hose clamps as the clamping means, though other means such as tape, tightly wound string, cord or rubber strips would work equally well. It has been found useful to use a removable seam sealer along split inside the hollow interior as well. Such seam seal may be liquid resistant tape, or pliable removable silicone, for example, and further prevents leakage through the split (42).

Next, like the preferred embodiment of the method, the hollow cylinder is affixed to a horizontal, rigid, non-porous surface such that the bottom of the cylinder in contact with the rigid, non-porous surface is sealed to that surface. Like the preferred embodiment, it is helpful to rout or otherwise place a groove into the rigid, non-porous surface into which the hollow cylinder will set. The hollow cylinder is also sealed to the rigid, non-porous surface non-porous clay (44).

Furthermore, the interior diameter of the hollow cylinder (45) should be sufficiently great so that when the nearly cylindrical rubber stamp is placed within the cylinder, the edges of the nearly cylindrical rubber stamp which are parallel to the cylinder's long axis and the split (42) do not touch, there being a gap (46) between those edges. Once inserted into the hollow interior of the cylinder, the nearly cylindrical rubber stamp exterior surface (foreground) is in direct contact with the interior surface of that cylinder. The exterior surface of the nearly cylindrical rubber stamp should be in sufficient contact with the interior surface of the hollow surface such that liquids cannot pass between the exterior surface of the nearly cylindrical stamp and the interior surface of the hollow cylinder. This contact may be better facilitated through the use of a removable adhesive such as rubber cement.

Next, the casting material is poured into the hollow cylinder, filling the cylinder. It should be appreciated that so filling the hollow cylinder causes the casting material to come into contact with the interior surface (47) of the nearly cylindrical rubber stamp. However, because the exterior surface of the nearly cylindrical rubber stamp is in direct contact with the interior surface of the hollow cylinder, the casting material is prevented from flowing between the exterior surface of the nearly cylindrical rubber stamp and the interior surface of the hollow cylinder, and the casting material comes in direct contact with the hollow cylinder only in those areas not occupied by the exterior surface of the nearly cylindrical rubber stamp. It has been found that the gap (6) is extremely desirable as it provides even more of the nearly cylindrical rubber stamp surface area to come into contact with the casting material, thereby ensuring a better attachment of the nearly cylindrical rubber stamp to the casting material once hardened.

The casting material is then allowed to set. Once the casting material has set, the clamping means (43) is removed, and the cylinder opened slightly along the split (42). The combination casting material and rubber sheet cylinder is then pulled free from the hollow cylinder.

A rigid cylinder constructed of solidified casting material inset with the nearly cylindrical rubber stamp (38), which may be referred to as the second production prototype has now been produced. It should be understood that the nearly cylindrical rubber stamp foreground is flush with the rigid cylinder exterior surface. The net result of second embodiment of this method at this point is the creation of a second production prototype which has the desired design "inlaid" into the exterior surface of the rigid cylinder, without the need to hand carve and fit the inlay. In the unlikely event that there are any flaws in either the surface of the second production prototype (for example, along the visible joints where the hardened casting material meets the nearly cylindrical rubber stamp), said flaws are filled with a filler material (such as putty or semi-hardened casting material) and then lightly sands the filler after it dries, thereby filling and obscuring any flaws which have been found.

The second production prototype is then placed within a second hollow cylinder. The second hollow cylinder should have an internal diameter somewhat greater than the internal diameter of the first hollow cylinder, and a height somewhat greater than the height of the production prototype, but otherwise be essentially identical to the first hollow cylinder (39). The somewhat larger second hollow cylinder is fastened and sealed to a substantially rigid, non-porous surface and sealed to that surface in the same manner in which the first hollow cylinder was.

Mold material is next poured into the second hollow cylinder, submerging the second production prototype and thereby completely covering all exposed areas of the second production prototype. The space between the somewhat larger second cylinder's interior surface and the exterior surface of the second production prototype is filled completely with the mold material. The mold material is then allowed to set. It should now be readily appreciated that the second cylinder's interior diameter must be greater than the production prototype's exterior diameter so that there is adequate room for the mold material, and that the mold material must have sufficient thickness so that it will not tear when being removed from the second production prototype, or the candles which will ultimately be made in it. It is preferred that the second hollow cylinder's interior diameter be approximately one inch greater than the first hollow cylinder's interior diameter. This may be modified depending upon the depth of the rubber stamp background, and flexibility of the mold material once set. Furthermore, the height of the second hollow cylinder must be somewhat greater than the height of the production prototype so that the production prototype may be completely covered with the mold material without overflowing the second hollow cylinder. It may be desirable to further fasten the production prototype to the substantially rigid, non-porous surface so that there is no leakage of room catalyzing rubber between the surface of the second production prototype and the substantially rigid, non-porous surface. This may be accomplished by the application of a removable sealer or glue to the surface of the production prototype which will be in contact with the substantially rigid, non-porous surface. However, should such an arrangement not be desired, it has been found possible to trim any of the room temperature catalyzing rubber which may seep between the surface of the production prototype which will be in contact with the substantially rigid, non-porous surface and the substantially rigid, non-porous surface, after said rubber has set.

Once the mold material has set, the second production prototype with its covering of mold material is removed from the second hollow cylinder. Like the preferred embodiment of the method, the mold material is then peeled or cut free of the second production prototype. The mold material which formerly covered the second production prototype may now be properly called the second rubber mold. The second rubber mold so produced is now ready for wax pouring and candle molding. It has been discovered that it is best to re-insert the second rubber mold within the second hollow cylinder prior to pouring the melted candle wax, as the second hollow cylinder provides support to the somewhat pliable second rubber mold (the second rubber mold at this point being hollow), and ensures proper formation of the final candle. Ideally, the second hollow cylinder is placed on a stable, horizontal surface prior to pouring the melted candle wax. The second rubber mold is then filled with the melted candle wax, and the melted candle wax is allowed to set. Obviously, a wick should be inserted into the second rubber mold prior to pouring the melted candle wax.

Having poured the melted candle wax into the second rubber mold, and allowed the melted candle wax to set and solidify, the second mold is pulled free of the completed candle. The candle produced by the second embodiment of the instant method bears upon its exterior surface a perfect three dimensional copy of the design originally found on the rubber stamp. As was noted above, it has been found that design elements which are present as foreground on a cylindrical candle are highly likely to be damaged during handling and transport. Therefore, a completed candle has now been created upon which the desired design appears as background, as per FIG. 2.

It may now be understood that the second embodiment of the method makes possible the production of candles having curved exterior surfaces (like the cylinder) which may be covered with design elements. Nowhere in the prior art does so simple and efficient a method for applying designs to candles having curved surfaces exist. The instant method allows the production of curved surface candles without the requirement of complicated die manufacturing or extensive hand carving of a hand carved original.

In a third embodiment of the method, completed candles having surface ornamentation may be produced where the candle to be so produced is neither a polygon nor a cylinder. Examples of these "other" shapes would be spheres and variations on cylinders having differing diameters along the cylinder's short axis (for example, an hour glass shape), including tangible objects such as coffee mugs (a cylinder with a "C" shaped handle attached thereto).

In the case of the "other" object, the method begins with an object which is to be reproduced as a wax candle. For purposes of understanding, inventor will describe the method for producing a candle which is a duplicate of a baseball, wherein the candle so produced also has a desired design such as the letter "J" on its exterior surface.

Figure 11:
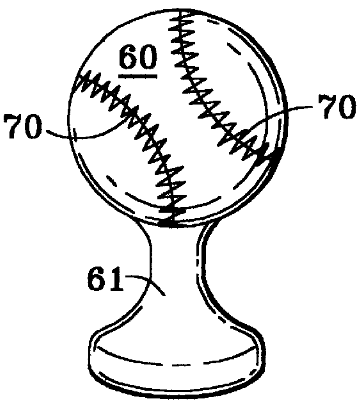
FIG. 11 is side view of an object mounted on a stem.

As per FIG. 11, the object to be reproduced (60) is rendered stationary by the construction of a stand (stem) (61) which will both support the object and ultimately serve as a means for introducing wax into a third rubber mold. The inventor prefers to utilize a pliable material, such as clay, which may be fashioned into a "stem" and be used to support and fixedly connect the surface upon which the mold is to be built, to the object to be reproduced. The stem has a first end and a second end, the first end being attached to the object and the second end being attached to the surface upon which the mold is to be built. It is believed that the surface to which the stem will be attached should be horizontal, substantially flat, non-porous and liquid impermeable.

Next, a relatively thick coating of a mold material such as urethane elastomer is placed on the exterior surface of both the object to be reproduced and the stem upon which it stands. The mold material should be of a type which may be liquefied and will set at room temperature, remaining somewhat pliable once set. It is believed that the rubber used to make the rubber mold in the second embodiment, or a urethane elastomer work best. The mold material is then allowed to set. In the third embodiment, the mold material, once applied to the object, may be referred to as the mold coating.

Figure 12:
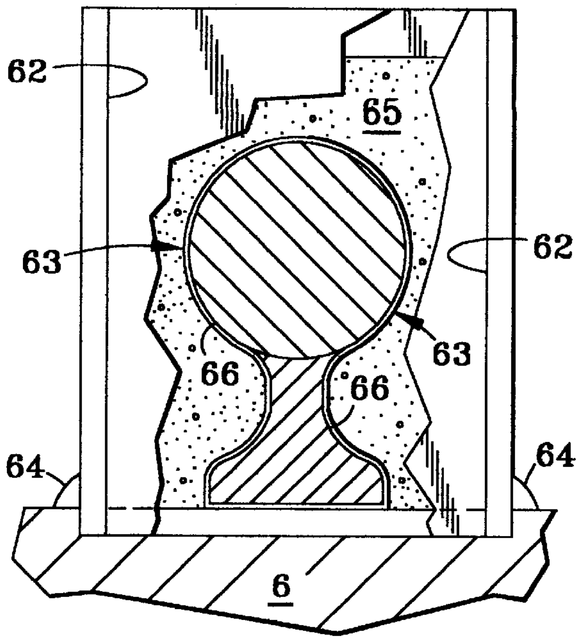
FIG. 12 is a cross sectional side view of a first exoskeleton and framework.

As per FIG. 12, once the mold coating (66) has set, inventor constructs what may be referred to as a first exoskeleton around the object to be reproduced. This is accomplished by constructing a fourth dam around the object such that there is a distance of at least ¼ of one inch between the fourth dam interior surface (62) and the object to be reproduced's rubber coated exterior surface (63) closest to the interior surface of the dam. The construction of the fourth dam is essentially identical to the construction of the second dam (32) in the preferred embodiment. The fourth dam is then sealed to the surface upon which it has been constructed using a material (64) which may later be removed with minimal effort. Sealing of the dam to the surface upon which it is to be constructed may be accomplished in the same manner described for attaching the second dam in the preferred embodiment of the method.

Construction of the first exoskeleton (65) then proceeds by filling the fourth dam with a porous material which solidifies at room temperature. This is accomplished by pouring a plastic urethane which is solidified with what is known in the trade as "catalyst F". This material, when solidified, is essentially a type of "foam rubber", having a great number of holes throughout (spongiforous) which is relatively pliable, yet sufficiently strong so as to support the object to be reproduced. The type of material used is unimportant so long as the exoskeleton, once completed, is relatively pliable, yet sufficiently strong so as to support the object to be reproduced. The object to be reproduced should be completely submerged in the spongiforous material.

The first exoskeleton is then removed by disassembling the fourth dam, and making a register cut or mold key cut along the first exoskeleton material so that the rubber coated object to be reproduced may be freed with its mold coating intact. The register cut is well known in the art of mold making. It is, in essence, a type of cut producing a nearly "s" shaped incision through the material (when viewed cross-sectionally, perpendicularly to the cut). A register cut may be used in the first and second embodiments as well, instead of the mold key cut.

Next, the mold coating surrounding the object to be reproduced is removed by cutting the mold coating open, once again using a register cut, and the object (with its attached stem) is pulled free from the mold coating. The third mold is now complete. As the "other shaped" object has now been removed, the third mold will have a hollow interior section (67), as per FIG. 13. The portion of the third mold interior surface (69) formerly in contact with any and all surface protuberances or indentations (68) locatable on the irregular object will bear those same marks, but in background/foreground reversal. In other words, a protuberance on the other shaped object will appear as an indentation into the third mold interior surface. In the example stated for the third embodiment, As per FIG. 11, the stitching found on the exterior of the baseball will appear as stitching on the interior surface of the third mold. However, where the stitching protruded from the surface of the baseball, as per FIG. 11, the stitching will appear as indentations (68) into the third mold interior surface.

Figure 13:
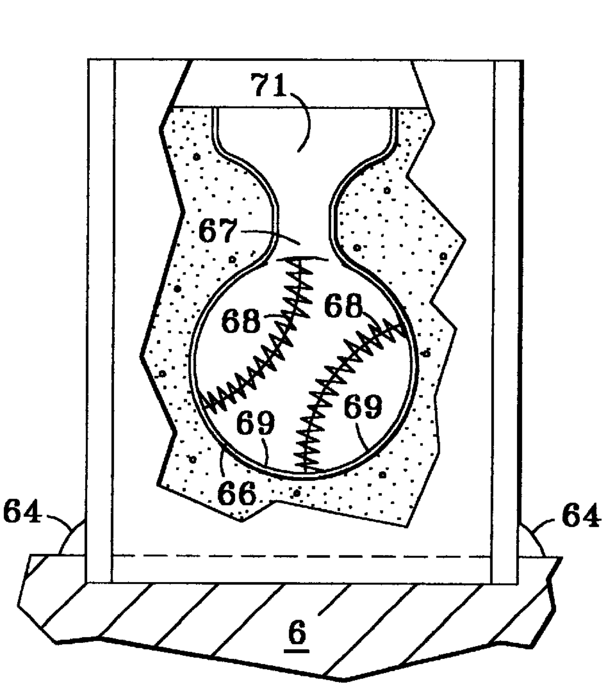
FIG. 13 is a cross sectional side view of a first exoskeleton and framework.

As per FIG. 13, having removed the other shaped object and the stand (61), thereby creating a "pouring spout" (71) which provides access to the now hollow interior of the third mold, the first exoskeleton and the fourth dam are reassembled with the mold coating replaced within the first exoskeleton. The first exoskeleton serves as a supporting framework for third mold having the hollow interior. The entire assembly is turned up-side down, and reattached to the substantially impermeable surface using clay or other suitable sealer, in the same manner as the second dam was attached and sealed in the preferred embodiment. The reorientation of the third mold is accomplished so that the "pouring spout" is now locatable at the top of the third mold, and may serve as an access point to the interior of the mold, allowing a liquid or colloidal solid to be poured into the hollow interior of the third mold.

The third mold is next filled with a liquefied casting material such as hydrocal, or any other plaster like material capable of setting at room temperature. The casting material may be the same as the casting material utilized in the preferred embodiment. Once set, the entire third mold is disassembled, and the hardened casting material is removed. It should be readily apparent that once set, the hardened casting material will be an exact duplicate of the original other shaped object and its attached stand or stem. This hardened casting material duplicate of the original other shaped object with its attached stand may be referred to as the plaster model.

Figure 14:
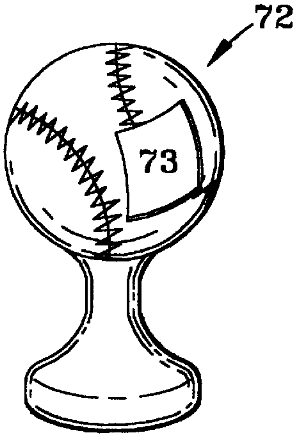
FIG. 14 is a perspective view of a plaster model having a flattened area.
Figure 15:
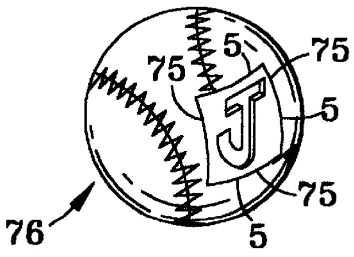
FIG. 15 is a perspective view of a plaster model having a rubber stamp mounted in a flattened area.

As per FIG. 14, inventor next creates an area upon the plaster model (72) to which the rubber stamp will be attached. Inventor creates a "flat area" (73) on the plaster model, using any suitable means such as a file, sand paper or carving knife. The depth that this flat area (73) extends into the plaster model is dependent upon the thickness of the rubber stamp which is to be attached into the flat area. The rubber stamp which is required by this third embodiment should be of the type where the design which is to appear on the exterior surface of the completed candle appears as foreground on the rubber stamp, as per FIG. 1, however, the design should not be a mirror image. That is, in keeping with the example used thus far, the letter "J" should appear just as it would be written, not as its mirror image. The rubber stamp is then attached to the flat area such that foreground on rubber stamp stands out somewhat from the surface of the plaster model, but the background of the stamp is essentially flush with the immediately adjacent surface of the plaster model. The remaining areas of the rubber stamp which are background will be flush with the surface of the plaster model where rubber stamp peripheral edges (74) and the immediately adjacent surfaces (75) of the plaster model meet.

Clearly, it is necessary to adequately secure the rubber stamp to the plaster model in order to ensure that the rubber stamp background is flush with the immediately adjacent plaster model exterior surface. This is accomplished by fixedly attaching the rubber stamp to the plaster model. In the preferred embodiment, the means for fixedly attaching is by gluing the rubber stamp to the plaster model. Also, it is believed that any slight imperfections in the areas where the rubber stamp peripheral edges and the immediately adjacent exterior surface of the plaster model meet may be removed by the application of soft filler which hardens at room temperature, and which may be sanded to a smooth finish. In the preferred embodiment this is accomplished using a latex based wood filler compound. However, it is entirely possible to use a casting material (which has slightly set and is therefore easier to work with) such as that from which the plaster model itself was prepared. The finished plaster model with inset rubber stamp is now complete, and functions as the third production prototype (76).

As disclosed thus far, the third production prototype has its stem or stand integrally attached to it. It should be understood, however, that it would be possible to remove the stand from the other shaped object while both were still composed of hardened casting material. In this case, inventor recommends careful "touch-up" of the area from which the stem or stand is removed by utilizing a filler material to remove evidence of the stand's former attachment. However, if the original other shaped is oriented such that the original stem is located such that the area of connection between object and stem will be hidden on the final candle, then no touch up work need be done.

The third production prototype is then rendered stationary, preferably by attaching the stem portion to a substantially flat, non-porous surface using a removable glue, or like means. Once stationary, the production prototype with its attached stand or stem are coated with a liquefied mold material which sets at room temperature, preferably, the same room temperature catalyzing rubber which was used to make the second rubber mold. The mold material is allowed to set, and is then sliced open such that the third production prototype may be removed, thereby producing a fourth mold. As should be understood, the interior surface of this fourth mold is now an exact duplicate of the other shaped object to be reproduced. The fourth mold further has the surface design originally present on the rubber stamp, also present on the fourth mold interior surface. All surface design (whether present on the original other shaped object, or on the rubber stamp) appear on the fourth mold interior surface in background/foreground reversal. In keeping with the examples used thus far, it may be understood that any protuberances on the production proto-type will appear as indentations into the fourth mold interior surface. Therefore, the stitching found on the exterior surface of the production prototype will appear as stitching on the interior surface of the fourth mold. However, where the stitching protruded from the surface of the production prototype, the stitching will appear as indentations (background) into the fourth mold interior surface.

In order to complete the process, a second exoskeleton is next created. To accomplish this, Applicant re-inserts the third production prototype within the fourth mold. The dam used to create the first exoskeleton is then reassembled around the fourth mold in the same manner it was constructed around the third rubber mold. As in the preparation of the third rubber mold, the reservoir is filled with the liquefied exoskeleton material.

Once the second exoskeleton has set, the dam is removed, and the second exoskeleton is cut open. The fourth mold is removed from the second exoskeleton, and the third production prototype is removed from within the fourth mold. The fourth mold is then placed back into the second exoskeleton and the dam is reconstructed about the second exoskeleton. As with the preparation of the production prototype, the whole assembly (combination exoskeleton and fourth mold) are inverted such that the pouring spout is accessible, thereby providing access to the hollow interior portion of the fourth mold.

Inventor then pours into the pouring spout the liquefied candle wax. Once the candle wax has set, the dam may be removed, the second exoskeleton and fourth molds pulled free and the final candle removed. The stem or stand (being made of the same wax as the candle) may be cut free of the final candle, and any imperfections may be removed. Those familiar with the art of candle making will readily recognize that such imperfections may be lightly sanded, or worked with a hot instrument such that the wax is slightly melted and more malleable. Also, as with the first and second embodiment, inventor has not disclosed the method for including the wick within the final candle as such method requires no new disclosure and may be accomplished as in the prior art.

Finally, it is believed that a fourth embodiment of his method may be useful when creating candles which are generally cylindrical, but have substantial protrusions as well. The fourth embodiment is begun by obtaining an object to be reproduced as a candle. An example of such an object is the coffee cup (or "mug") noted earlier. The coffee cup as described is generally cylindrical and has attached thereto an essentially "C" shaped handle, the open end of the "C" serving as the attachment to the cup.

The fourth embodiment may be thought of as essentially a combination of the second and third embodiments. In the fourth embodiment, the first hollow cylinder (39) is attached to the substantially horizontal, flat, non-porous and impermeable surface as it was in the second embodiment. Next, the slit (42) described in the second embodiment is enlarged (widened) into a slot along a sufficient area of its length so as to permit the coffee cup handle to protrude out of the first hollow cylinder. An auxiliary dam is constructed on the outside surface of the first hollow cylinder, around the slot, such that the handle is contained within the auxiliary dam (that is, the handle sides and bottom are encompassed by the auxiliary dam). This may be most easily accomplished by attaching two side walls to the exterior surface of the first hollow cylinder, proximate to the protruding handle, the side walls being perpendicular to the slot. A bottom wall is attached to the two side walls, spanning the space between the side walls, and underlying the protruding handle. An outer wall is attached to the two side walls, spanning the distance between the two side walls, perpendicularly to both the side walls and the bottom wall. Attachment of the auxiliary dam may be accomplished in any number of ways including gluing or taping the auxiliary dam together and onto the first hollow cylinder, so long as once so assembled, the liquefied mold material will not leak out. The first hollow cylinder may be further sealed as disclosed in the second embodiment by placing clamping means circumferentially around the exterior of the first cylinder. It has also been found useful to invert the coffee cup prior to placing it within the first cylinder such that the rim of the coffee cup is in contact with the substantially horizontal, flat, non-porous and impermeable surface, thus preventing the hollow interior of the coffee cup from filling with liquefied mold material.

Next, the fourth embodiment proceeds in the same fashion as the second embodiment, with the liquefied mold material being poured into the first hollow cylinder, filling both the first hollow cylinder and the auxiliary dam and thus completely covering the coffee cup. The mold material is allowed to set and solidify at room temperature into a fifth mold.

The fifth mold is then removed from the first hollow cylinder and the coffee cup is freed from the fifth mold in the manner set forth in the second embodiment. Once the coffee cup has been removed from the fifth mold, the now hollow fifth mold is inverted and replaced within the first hollow cylinder. While the auxiliary dam may be reconstructed in order to provide additional support, it has been found that this is usually unnecessary.

Next, the fifth mold is completely filled with liquefied casting material. The liquefied casting material is then allowed to harden at room temperature, becoming a second plaster model. Once so hardened, the second plaster model is removed from the fifth mold.

The fourth embodiment then incorporates a portion of the method disclosed in the third embodiment. A rubber stamp is created having the desired design upon it, the design appearing as background (assuming the candle is to have the desired design appear on its surface as background). As with the plaster model of the third embodiment, the second plaster model is carved such that a flat area is produced upon its exterior surface. The flat area is created and proportioned in the same manner as was the flat area disclosed in the third embodiment. Furthermore, the rubber stamp is then attached to the second plaster model in the same manner as disclosed in preparing the plaster model of the third embodiment.

Next, the second plaster model having inset into its exterior surface the rubber stamp is placed within the first hollow cylinder and the auxiliary dam is reconstructed in the same manner as described earlier. The first hollow cylinder is attached to the substantially horizontal, flat, non-porous and impermeable surface, and any potential leaks are closed (for example, by taping, gluing or inserting clay so as to prevent leakage from within the hollow cylinder and the auxiliary dam).

Liquefied mold material is then poured into the first hollow cylinder so that both the first hollow cylinder and the auxiliary dam are completely filled, thereby completely covering and submerging the second plaster model. The liquefied mold material is allowed to set at room temperature becoming a sixth mold.

Next, the sixth mold is removed from the first hollow cylinder, and the second plaster model is freed from within the sixth mold. The sixth mold is then inverted and reinserted within the first hollow cylinder. The now hollow sixth mold is then filled with liquefied casting material, and the liquefied casting material is allowed to harden at room temperature, the liquefied casting material becoming the fourth production prototype. Any imperfections found on the exterior surface of the fourth production prototype may be removed in the manner described for eliminating imperfections on the third prototype, as described in the third embodiment.

The sixth mold is once again removed from the first hollow cylinder, and the fourth production prototype is removed from within the sixth mold.

The fourth production prototype is then replaced within the first hollow cylinder and the auxiliary dam is reconstructed and attached to the substantially horizontal, flat, liquid impermeable surface, the first hollow cylinder and the auxiliary dam being sealed so as to prevent leakage. Both the first hollow cylinder and the auxiliary dam are then filled with liquefied mold material, thus covering and submerging the fourth production prototype. The liquefied mold material is allowed to set at room temperature, and once set becomes the seventh mold. The seventh mold is removed from the first hollow cylinder and the fourth production prototype is freed from within the seventh mold.

The seventh mold is inverted and replaced within the first hollow cylinder such that the now hollow seventh mold may be filled with liquefied candle wax. A wick is placed within the seventh mold and liquefied candle wax is poured into the seventh mold, completely filling the seventh mold. Once hardened at room temperature the completed candle may be removed from the seventh mold. As with the second and third embodiments, the completed candle created using the fourth method will have upon its exterior surface an exact copy of the desired design originally produced on the rubber stamp (naturally, design appearing on the completed candle is a mirror image copy of the rubber stamp).

Inventor notes that while the fourth embodiment has been described as reproducing a coffee cup, many other sorts of objects which can not be easily produced using the first, second or third embodiments of his method may be reproduced as a candle, as well.

I claim:

1. A method for producing candles having three dimensional surface designs comprising;

A. creating a rubber stamp having upon it a mirror image copy of a surface design which is to appear on the candles, B. placing the rubber stamp upon a substantially flat, non-porous, liquid impermeable surface, the mirror image copy of the surface design facing upwardly, away from the substantially flat, non-porous, liquid impermeable surface, C. building a first dam atop the rubber stamp, the first dam and rubber stamp defining a reservoir, D. securely fastening the first dam to the a substantially flat, non-porous, liquid impermeable surface so that the reservoir is leak proof, E. coating the reservoir with a release agent, F. creating hardened castings, I. the hardened castings being created by a. pouring a rigid mold material into the reservoir, b. allowing the rigid mold material to harden, c. disassembling the first dam, d. removing the hardened casting, i. the hardened casting having upon its surface the surface design, G. connecting the hardened castings to one another such that the surface of each hardened casting having upon it the desired design faces outwardly, away from each other hardened casting, I. the connected hardened castings forming a first production prototype, a. the first production prototype having a hollow interior, b. the first prototype having exterior surfaces, H. filling the first production prototype hollow interior with filler material, I. fastening the first production prototype to a substantially flat, horizontal, level, non-porous, liquid impermeable surface, J. assembling a second dam around the first production prototype, I. the second dam having a continuous interior surface, K. sealing the second dam to the substantially flat, level, non-porous, liquid impermeable surface, I. once sealed, the second dam continuous interior surface, the first production prototype exterior surfaces, and the substantially flat, horizontal, level, non-porous, liquid impermeable surface directly underlying a space between the second dam continuous interior surface and the production prototype exterior surfaces constituting a mold reservoir, L. filling the mold reservoir with a liquefied mold material so that the first production prototype is completely covered, M. allowing the mold material to harden into a first candle mold, N. disassembling the second dam, O. removing the first production prototype from the first candle mold, P. inverting the first candle mold, Q. reassembling the second dam around the first candle mold, R. placing a candle wick within the first candle mold, S. pouring liquefied candle wax into the first candle mold, T. allowing the liquefied candle wax to resolidify into a completed candle, U. disassembling the second dam, V. removing the completed candle from the first candle mold, the completed candle having the surface designs.

2. A method for producing candles having three dimensional surface designs comprising;

A. creating a rubber stamp having upon it a copy of a surface design which is to appear on the candles, B. folding the rubber stamp into the form of nearly a cylinder I. the rubber stamp having length, width, an exterior surface and side edges, a. the side edges of the rubber stamp being brought into close proximity with one another, b. the surface design being locatable on the rubber stamp exterior surface, C. placing the rubber stamp within a substantially rigid, first hollow cylinder, I. the substantially rigid, first hollow cylinder having length and diameter, a. the rubber stamp length being less than the substantially rigid, first hollow cylinder length, II. the substantially rigid, first hollow cylinder having a split along its entire length, D. wrapping a clamping means around the substantially rigid, first hollow cylinder, E. tightening the clamping means sufficiently to prevent leakage through the split, F. affixing the substantially rigid, first hollow cylinder to a rigid, horizontal, non-porous surface, I. the substantially rigid, first hollow cylinder being affixed such that the bottom of the substantially rigid, first hollow cylinder is in contact with the rigid, horizontal, non-porous surface and is sealed to that surface, G. filling the substantially rigid, first hollow cylinder with a casting material, H. allowing the casting material to set, I. removing the substantially rigid, first hollow cylinder from the rigid, horizontal, non-porous surface, I. removing the clamping means from the substantially rigid, first hollow cylinder, J. removing the casting material from the substantially rigid, first hollow cylinder I. the combination set casting material and rubber stamp having height and an exterior diameter, K. placing the combination set casting material and rubber stamp in a second hollow cylinder, I. the second hollow cylinder having height and an internal diameter, a. the second hollow cylinder internal diameter being somewhat greater than the combination set casting material and rubber stamp exterior diameter, b. the second hollow cylinder height being somewhat greater than the combination set casting material and rubber stamp height, L. fastening and sealing the second hollow cylinder to the rigid, horizontal, non-porous surface, M. pouring a sufficient amount of a mold material into the second hollow cylinder so that the combination set casting material and rubber stamp is submerged in the mold material, N. allowing the mold material to set, O. removing the mold material from the second hollow cylinder, P. removing the mold material from the combination set casting material and rubber stamp, I. the mold material now being hollow, having an open end, the mold material open end formerly being in contact with the rigid, horizontal, non-porous surface Q. inverting the mold material, R. reinserting the mold material within the second hollow cylinder, S. inserting a wick within the mold material, T. filling the mold material with a melted candle wax, U. allowing the melted candle wax to set into a completed candle, V. removing the completed candle from the mold material.

3. A method for producing candles having three dimensional surface designs according to claim 2, further comprising:

A. the substantially rigid, first hollow cylinder being transparent.

4. A method for producing candles having three dimensional surface designs comprising;

B. obtaining an object to be reproduced as the candles,

C. constructing a stem,

I. the stem having a first end and a second end,

D. rendering the object stationary by attaching the stem first end to the object and the stem second end to a horizontal, substantially flat, non-porous and liquid impermeable surface, E. coating the object and the stem with a liquefied mold material, F. allowing the liquefied mold material to set, I. the set mold material being referred to as the mold coating, G. constructing a dam about the object and stem having the mold coating, H. sealing the dam to the substantially flat, non-porous and liquid impermeable surface, I. filling the dam with a porous material which solidifies at room temperature such that the object is completely submerged, J. allowing the porous material to solidify, I. the combination dam and solidified porous material being referred to as a first exoskeleton, H. disassembling the first exoskeleton, I. removing the object and stem having the mold coating from the first exoskeleton, J. removing the mold coating from the object and the stem, I. the mold coating now being hollow and having a pouring spout, K. placing the mold coating back into the first exoskeleton, L. inverting the first exoskeleton such that the pouring spout is visible, M. attaching the first exoskeleton to the horizontal, substantially flat, non-porous and liquid impermeable surface, N. filling the mold coating with a liquefied casting material, O. allowing the liquefied casting material to set, I. the liquefied casting material, once set, being referred to as a plaster model, P. disassembling the first exoskeleton, Q. removing the mold coating from the first exoskeleton, R. removing the plaster model from the mold coating, S. creating a flat area on the plaster model, T. attaching a rubber stamp to the plaster model flat area, I. the rubber stamp having upon it a copy of a surface design which is to appear on the candles, U. attaching the combination rubber stamp and plaster model to the horizontal, substantially flat, non-porous and liquid impermeable surface, V. coating the combination rubber stamp and plaster model with liquefied mold material, W. allowing the liquefied mold material to set, X. reconstructing the dam about the liquefied mold material which has set, Y. attaching and sealing the dam to the substantially flat, non-porous and liquid impermeable surface, Z. filling the dam with a porous material which solidifies at room temperature such that the fourth mold is completely submerged, AA. allowing the porous material to solidify, I. the combination dam and solidified porous material being referred to as a second exoskeleton, BB. disassembling the second exoskeleton, CC. removing the liquefied mold material which has set, from within the second exoskeleton, DD. removing the combination rubber stamp and plaster model, from within the liquefied mold material which has set, EE. reinserting the liquefied mold material which has set, within the second exoskeleton, FF. inverting the second exoskeleton, GG. placing a candle wick within the liquefied mold material which has set, HH. filling the liquefied mold material which has set, with liquefied candle wax, II. allowing the liquefied candle wax to set into a final candle, JJ. disassembling the second exoskeleton, KK. removing the liquefied mold material which has set, from the second exoskeleton, LL. removing the final candle from the liquefied mold material which has set.

5. A method for producing candles having three dimensional surface designs comprising;

A. obtaining an object to be reproduced as the candles,

I. the object to be reproduced having a protrusion,

B. attaching a first hollow cylinder to a substantially horizontal, flat, non-porous and impermeable surface, I. the first hollow cylinder having length, diameter, an interior surface and an exterior surface, a. the first hollow cylinder having a split along its entire length, i. the split being widened such that a slot is created, C. placing the object to be reproduced within the first hollow cylinder, such that the protrusion extends out of the first hollow cylinder, through the slot, D. constructing an auxiliary dam on the first hollow cylinder exterior surface such that the auxiliary dam encompasses the sides and bottom of the protrusion located on the object to be reproduced, I. sealing the first hollow cylinder and the auxiliary dam so as to make them leak proof, E. pouring a liquefied mold material into the first hollow cylinder, the liquefied mold material filling both the first hollow cylinder and the auxiliary dam so that the object to be reproduced is submerged in the liquefied mold material, F. allowing the liquefied mold material to set, G. removing the set mold material from both the first hollow cylinder and the auxiliary dam, H. removing the object to be reproduced from the set mold material, I. inverting the set mold material, J. inserting the inverted set mold material back into the first hollow cylinder, K. completely filling the set mold material with a liquefied casting material, L. allowing the liquefied casting material to harden, I. the liquefied casting material, once hardened, having an exterior surface, M. removing the set mold material from the first hollow cylinder, N. removing the hardened casting material from the set mold material, O. creating a rubber stamp, I. the rubber stamp having upon it the desired design, P. carving a flat area on the hardened casting material exterior surface, Q. embedding the rubber stamp into the hardened casting material flat area, R. placing the hardened casting material into the first hollow cylinder, S. securing the first hollow cylinder to the substantially horizontal, flat, non-porous and impermeable surface, I. sealing the first hollow cylinder and the auxillary dam so as to make them leak proof, T. filling both the first hollow cylinder and the auxiliary dam with the liquefied mold material such that the hardened casting material is completely submerged in the liquefied mold material, U. allowing the liquefied mold material to set, I. the liquefied mold material, once set, being a production prototype mold, V. removing the production prototype mold from both the first hollow cylinder and the auxiliary dam, W. inverting the production prototype mold, X. placing the production prototype mold within the first hollow cylinder, Y. securing the first hollow cylinder to the substantially horizontal, flat, non-porous and impermeable surface, Z. filling the production prototype mold with the liquefied casting material, AA. allowing the liquefied casting material to set, I. the liquefied casting material, once set, being referred to as the production prototype, BB. removing the production prototype mold from both the first hollow cylinder and the auxiliary dam, CC. removing the production prototype from the production prototype mold, DD. placing the production prototype within the first hollow cylinder, EE. securing the first hollow cylinder to the substantially horizontal, flat, non-porous and impermeable surface, I. sealing the first hollow cylinder and the auxiliary dam so as to make them leak proof, FF. filling both the first hollow cylinder and the auxiliary dam with the liquefied mold material, GG. allowing the liquefied mold material to set, I. the liquefied mold material, once set, being referred to as a completed candle mold, HH. removing the completed candle mold from both the first hollow cylinder and the auxiliary dam, II. removing the production prototype from the completed candle mold, JJ. inverting the completed candle mold, KK. inserting the completed candle mold within the first hollow cylinder, LL. placing a wick within the completed candle mold, MM. filling the completed candle mold with liquefied candle wax, NN. allowing the liquefied candle wax to set, I. the liquefied candle wax, once set, being referred to as the completed candle, OO. removing the completed candle mold from the first hollow cylinder, PP. removing the completed candle from the completed candle mold.

* * * * *